United States Patent [19]

Goodlaxson et al.

[11] 4,039,209
[45] Aug. 2, 1977

[54] COUPLER ASSEMBLY HAVING SEGMENTAL LOCKING RING

[75] Inventors: John D. Goodlaxson, Colfax; Frank E. Ross, Newton, both of Iowa

[73] Assignee: The Maytag Company, Newton, Iowa

[21] Appl. No.: 671,059

[22] Filed: Mar. 29, 1976

[51] Int. Cl.² .................................... F16L 37/12
[52] U.S. Cl. ........................... 285/8; 285/39; 285/316
[58] Field of Search ............ 285/316, 315, 277, 321, 285/8, 39, 382.7, 314

[56] References Cited

U.S. PATENT DOCUMENTS

| | | | |
|---|---|---|---|
| 2,135,223 | 11/1938 | Scheiwer | 285/277 X |
| 2,225,610 | 12/1940 | Christian | 285/277 |
| 2,318,965 | 5/1943 | Parker et al. | 285/277 X |
| 2,935,338 | 5/1960 | Mills, Jr. | 285/277 X |
| 3,352,576 | 11/1967 | Thorne-Thomson | 285/316 X |
| 3,439,943 | 4/1969 | Thorne-Thomson | 285/316 |
| 3,847,393 | 11/1974 | Busselmeier | 285/315 |
| 3,922,011 | 11/1975 | Walters | 285/277 |

*Primary Examiner*—Thomas F. Callaghan
*Attorney, Agent, or Firm*—Richard L. Ward

[57] ABSTRACT

A coupler assembly for a portable washing machine which includes a locking ring or locking means having a plurality of arcuate segments connected by intermediate web sections. The locking ring assembles onto a coupler body with the arcuate segments at least partially extending through slots in the coupler body and is cooperable with an encircling retaining ring for locking engagement with a faucet.

9 Claims, 3 Drawing Figures

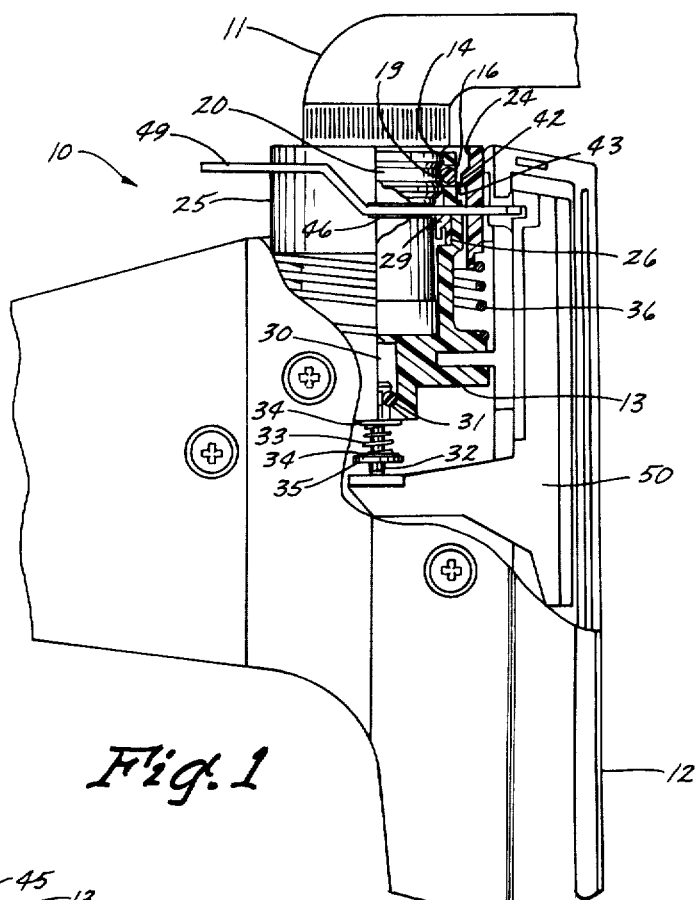
Fig. 1
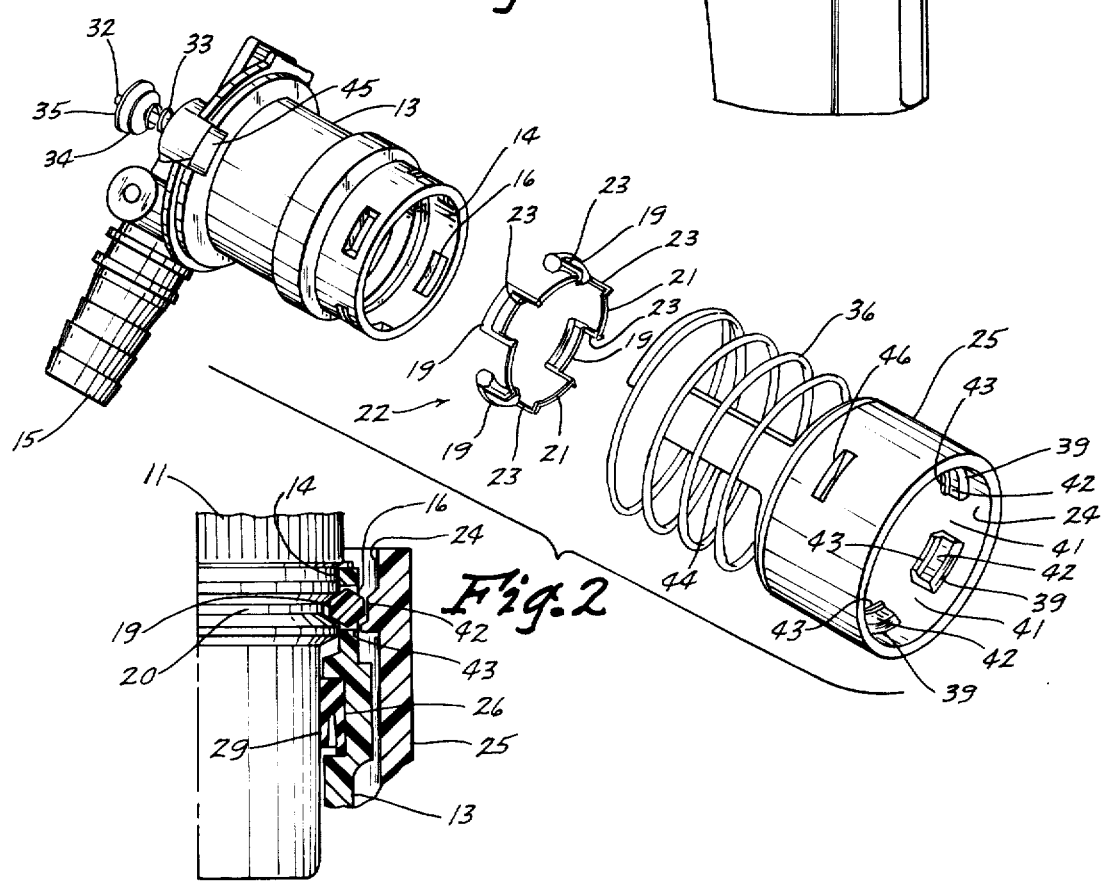
Fig. 2
Fig. 3

COUPLER ASSEMBLY HAVING SEGMENTAL LOCKING RING

BACKGROUND OF THE INVENTION

1. Field of the Invention

This invention relates generally to fluid handling devices and more particularly to an improved device for locking a coupler assembly to a faucet.

2. Description of the Prior Art

Prior art coupler assemblies have almost universally used individual metal spherically shaped members for faucet locking means. These individual spherical members have been especially common in the all-metal coupler assemblies but are inconvenient to assemble to the coupler body. Furthermore, when the metal spherical locking members are used in conjunction with a thermoplastic coupler assembly, the point contact between the spherical members and the plastic coupler parts causes the spherical members to gouge into the plastic which will result in excessive play between the retaining ring and the spherical members and possibly cause pulling apart of the assembly or other premature failure of the coupler. Also, in a plastic coupler, it is difficult to maintain the close tolerances required for mounting the metal spherical locking members in the plastic coupler body.

A construction representing an exception to the common use of spherical locking members is shown in U.S. Pat. No. 3,055,392 wherein a plurality of triangular cams are pivotally supported on a ring which snaps into a circumferential groove in the coupler body. These cams pivot into engagement with a groove in the faucet for locking the coupler in place.

SUMMARY OF THE INVENTION

It is an object of this invention to provide an improved coupler assembly for a washing machine.

It is a further object of this invention to provide an improved locking member for locking a coupler assembly to a faucet.

It is a further object of this invention to provide a locking member which provides increased contact area between the locking member and the various coupler assembly parts.

It is a further object of this invention to provide a locking means made up of individual locking segments joined by intermediate webs.

The instant invention achieves these objects in a coupler assembly having a coupler body with a plurality of angularly-spaced slots adjacent an inlet for receiving arcuate locking segments of a locking ring. The segments are secured radially by contact with segmental shoulders on the inner periphery of a retaining ring to effect a locking engagement of the locking segments with a faucet received within the inlet portion of the coupler body.

Operation of the device and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views, wherein:

FIG. 1 is a partial view of a coupler assembly for a portable washer wherein the coupler assembly is partially broken away and sectioned and incorporates the instant invention;

FIG. 2 is an exploded view showing the assembly of the coupler body incorporating the instant invention;
and FIG. 3 is an enlarged partial view showing the assembled relationship of the coupler body, locking ring, and retaining ring.

DESCRIPTION OF A PREFERRED EMBODIMENT

Referring to FIG. 1 there is shown a coupler assembly 10 coupled to a faucet 11. A housing 12 having, in this embodiment, a plurality of communicating compartments or cavities contains and supports the various coupler components which will be described further herein.

As shown in FIG. 1, the coupler assembly 10 includes a coupler body 13 contained and supported within the housing 12. The coupler body 13 is molded of a thermoplastic material and is generally in the configuration of a right angled elbow as best shown in FIG. 2. The coupler body 13 has an inlet end 14 for coupling with a faucet 11 as shown in FIG. 1 and an outlet end 15 for receiving a rubber inlet hose (not shown) which conducts liquid to a washing machine.

Adjacent the inlet end 14 of the coupler body 13, as shown in FIG. 2, are a plurality of slots 16 for receiving a plurality of locking segments 19. These locking segments 19 have an arcuate shape and a hexagonal cross section. As shown in FIG. 3, the hexagonal cross section of the locking segment 19 contacts the faucet groove or recess 20 with the inner arcuate portion of each segment having substantially the same radius as the faucet groove or recess 20. The arcuate locking segments 19 present a large contact surface for locking the coupler body 13 to the faucet 11. The locking segments 19 are joined by intermediate rectangular web sections 21, as shown in FIG. 2. The web sections 21 join with the locking segments 19 to form a continuous locking ring 22. As an alternate to a continuous ring 22, one of the rectangular web sections 21 could be omitted and the locking segments 19 in combination with the web sections 21 would still form an annular unitary ring.

As shown in FIG. 2, the rectangular webs 21 include legs 23 which extend axially toward the inlet end 14 of the coupler body 13. These legs 23 are connected by an arcuate portion that in an assembled posture is juxtaposed to and overhangs the inlet end 14 of the coupler body 13. The outside diameter of this arcuate portion is approximately equal to the outside diameter of the coupler body 13. The actual length of the rectangular web 21 exceeds the dimension between slots 16 so that when assembled onto the coupler body 13 radial movement of the segment is possible when the assembly is in a faucet receiving-releasing position.

When assembled onto the coupler body 13 a first portion of each of the locking segments 19 extends outwardly beyond the surface for engagement with the inner diameter 24 of a retaining ring 25. A second portion extends through the slot 16 in the coupler body 13 for engagement with the annular groove 20 on the faucet 11 to lock the coupler assembly 10 to the faucet 11. The ends of these slots 16 are tapered so that the arcuate length of the slot on the inside is less than on the outside with the taper on the ends matching a similar taper on the ends of the arcuate segments 19. The length of the segments is such that the second inner portion of each of the locking segments 19 will extend far enough through the coupler body 13 to engage with the annular groove 20 on the faucet 11 but the locking segment 19 will not pass completely through the slot 16.

As further shown in FIGS. 1 and 3, the inlet end 14 of the coupler body 13 also has an inner annular groove 26 located axially inward from the locking segment 19 for receiving a circular rubber seal 29 to prevent fluid from escaping from the faucet 11.

Coaxial with the inlet end 14 of the coupler body 13 and intermediate the inlet 14 and outlet 15 is a pressure release passageway 30 as shown in FIG. 1. Mounted in this passageway 30 is an "O-ring" seal 31 and a pressure relief valve 32. The head portion of the pressure relief valve 32 is biased toward the "O-ring" seal 31 by a valve spring 33 which surrounds the shaft of the valve and which is maintained in position on the valve shaft by two washers 34 and a locking ring 35.

As best shown in FIG. 2 a retaining ring 25 and a retaining spring 36 are assembled onto the coupler body 13 for cooperating with the locking segments 19 to retain the locking segments 19 between the coupler body 13 and the retaining ring 25. The retaining ring 25 has a plurality of angularly-spaced radially inwardly extending segmental shoulders 39 around its inner periphery or inner diameter 24 which define a plurality of recesses 41, as shown in FIG. 2, with one shoulder 39 and one recess 41 for each of the plurality of locking segments 19. As shown in FIG. 2, the shoulders 39 are equally spaced around the inner periphery 24 of the retaining ring 25 with the recesses 41 equally disposed between the shoulders 39.

As further shown in FIG. 2 and in FIG. 3, the inwardly extending segmental shoulders 39 have two levels. A first level 42 for engaging the locking segments 19 between the coupler body 13 and the retaining ring 25. This first level 42 also radially holds the locking segments 19 into engagement with the faucet groove 20 to maintain a coupled posture between the faucet 11 and the coupler body 13. A second level 43 defines an annular stop for limiting movement of the retaining ring 25 on the coupler body 13 in an axial direction toward the inlet end 14. Engagement of the second level 43 with the locking segment 19 prevents the retaining ring 25 from coming off the coupler body 13.

The inner diameter or inner periphery 24 of the retaining ring 25 cooperates with the coupler body 13 to provide a third level of contact and to allow the locking segments 19 to move radially outward in the faucet receiving-releasing position. The locking segments 19 are prevented from completely moving out of their slots 16 by the proximity of the third level or innner periphery 24 to the coupler body 13.

Generally, the assembly of the locking ring 22, retaining ring 25 and retaining spring 36 to the coupler body 13 is accomplished by first placing the locking ring 22 onto the coupler body 13 so that the locking segments 19 engage with the slots 16 and the web sections 21 overhang the inlet end 14 of the coupler body 13. The retaining ring 25 with the retaining spring 36 assembled to it is oriented so that the segmental shoulders 39 line up with the recesses 41 between the locking segments 19 with the leg portion 44 beneath the retaining spring 36. The retaining ring 25 is moved axially onto the coupler body 13 and rotated through approximately 45° counterclockwise to lock the leg portion 44 of the retaining ring 25 into a detent slot 45 which retains the ring 25 angularly. The retaining ring 25 is retained axially by at least partial alignment of the segmental shoulders 39 with the locking segments 19. This system of assembly of the retaining ring 25 and retaining spring 36 onto the coupler body 13 is further disclosed and claimed in application Ser. No. 660,321 entitled "Retaining Ring Assembly for Faucet Coupler" filed on Feb. 23, 1976 by John D. Goodlaxson and assigned to the assignee of the instant invention.

Mounted on the retaining ring in two support slots 46, as best shown in FIG. 2, is an operating lever 49, as shown in FIG. 1. This lever 49 cooperates with a slider 50 to sequentially operate the pressure relief valve 32 and to move the retaining ring 25 from the faucet locking position to the faucet receiving-releasing position. The feature of sequential depressurization and decoupling is disclosed and claimed in application Ser. No. 660,322 entitled "Faucet Coupler Assembly" filed on Feb. 23, 1976 by John D. Goodlaxson and assigned to the assignee of the instant invention.

With the locking ring 22 in place and coupler assembled in a faucet locking position, depression of the operating lever 49 first depressurizes the coupler and then axially moves the retaining ring 25. When the retaining ring 25 is moved a predetermined distance, the locking segments 19 are free to move in a radially outward direction to release the faucet 11 from the coupler assembly 10.

It is therefore seen that the instant invention provides clear and distinct advantages over faucet coupler assemblies shown in the prior art. The instant invention provides a locking ring 22 having arcuate locking segments 19 which provide increased contact area between the locking segment 19 and a faucet groove 20. The locking segments 19 also provide increased contact area in the coupler assembly 10 between the segments 19 and the retaining ring 25. Also, assembly of the coupler is simplified with the locking ring 22 since the locking segments 19 will not fall out of the slots 16 as individual pieces tend to do.

In the drawings and specification there has been set forth a preferred embodiment of the invention and although specific terms are employed these are used in a generic and descriptive sense only and not for purposes of limitation. Changes in form and proportion of parts, as well as the substitution of equivalents, are contemplated, as circumstances may suggest or render expedient, without departing from the spirit or scope of this invention as defined in the following claims.

We claim:

1. A coupler assembly for connecting a fluid conduit to a faucet having a recess adjacent an outlet end, the combination comprising: a coupler body having an inlet end for receiving the outlet end of said faucet, said coupler body further including a plurality of circumferentiallyextending angularly-spaced slots located generally at said inlet end and defining openings extending through the wall of said coupler body; means for locking said inlet end to said faucet including a retaining ring encircling the inlet end of said coupler body and further including a plurality of interconnected elongated locking members disposed generally between said retaining ring and said inlet end of said coupler body, said means for locking still further including deformable means having a substantially reduced cross-section as compared to said locking members and connecting adjacent locking members to form a unitary annular ring, said deformable means having a total length between connected locking members exceeding the arcuate distance therebetween and being disposed at least partially in a different plane than said locking members, said elongated locking members each having a portion extending through one of the openings in said coupler body for engagement with said recess in said faucet and being cooperable with said slots and with said retaining ring to axially lock said coupler body to said faucet; and spring means for axially biasing said retaining ring toward an operative position for maintaining said elongated locking members in locking engagement with said faucet.

2. A coupler assembly as defined in claim 1 wherein said elongated locking members are generally arcuate shaped segments.

3. A coupler assembly as defined in claim 2 wherein said deformable means join with said arcuate locking segments to form an endless annular ring.

4. A coupler assembly as defined in claim 1 wherein said deformable means include leg portions extending axially toward said inlet end connected by an arcuate portion which juxtaposes said inlet end and has an outside diameter approximating the outside diameter of said coupler body.

5. A coupler assembly as defined in claim 2 wherein said arcuate locking segments have a generally hexagonal cross section.

6. A coupler assembly for connecting a fluid conduit to a faucet having a recess adjacent an outlet end, the combination comprising: a coupler body having an inlet end for receiving said faucet, said coupler body further including a plurality of circumferentially-extending angularly-spaced slots adjacent said inlet end and defining openings extending through the wall of said coupler body; means for locking said inlet end to said faucet including a retaining ring encircling the inlet end of said coupler body and manually movable from a faucet locking position to a faucet receiving-releasing position, said means for locking further including a plurality of arcuate locking segments disposed generally between said retaining ring and the inlet end of said coupler body and joined by webs to form an annular locking ring, said webs being disposed at least partially in a different plane than said locking segments each having a total length exceeding the arcuate distance between adjacent locking segments with said webs having a substantially reduced cross-section as compared to said locking segments and has been inserted being deformable to accommodate movement of said locking segments, said segments having a portion extending through the openings in said coupler body for engagement with said faucet and being cooperable with said slots and with said retaining ring to lock said coupler body to said faucet; and spring means for axially biasing said retaining ring to said faucet locking position to maintain said arcuate locking segments in locking engagement with said faucet.

7. A coupler assembly as defined in claim 6 wherein said arcuate locking segments are free to move radially outward in the faucet receiving-releasing position to enable said assembly to receive or release said faucet.

8. A coupler assembly as defined in claim 6 wherein said retaining ring further includes a plurality of angularly-spaced radially inwardly extending segmental shoulders around the inner periphery for at least partially engaging with said arcuate locking segments when in said faucet locking position to prevent axial movement of said retaining ring when under the bias of said spring means.

9. A coupler assembly for connecting a portable washing machine to a faucet disposed generally above a sink and having a recess adjacent an outlet end, the combination comprising: a housing defining at least one cavity therewithin; a coupler body supported at least partially within said housing and having an inlet end connectable to said faucet and an outlet end connectable to said machine, said coupler body further including a plurality of circumferentially-extending angularly-spaced slots adjacent said inlet end and defining openings extending through the wall of said coupler body; means for locking said inlet end to said faucet including a retaining ring encircling the inlet end of said coupler body and having a plurality of angularly-spaced radially inwardly extending segmental shoulders around the inner periphery and being manually movable from a faucet locking position to a faucet receiving-releasing position, said means for locking further including a plurality of arcuate locking segments joined by webs to form an annular locking ring, said webs including axially extending leg portions connected by an arcuate portion which in the assembled posture of said locking ring is juxtaposed to and overhangs said inlet end of said coupler body with an outside diameter generally approximating the outside diameter of said coupler body, said locking segments being operable for cooperating with said slots and with said segmental shoulders of the retaining ring to lock said coupler body to said faucet; and spring means for axially biasing said retaining ring to said faucet locking position to at least partially engage said segmental shoulders with said arcuate locking segments to maintain said arcuate locking segments in locking engagement with said faucet.

* * * * *